Patented June 8, 1943

2,321,218

UNITED STATES PATENT OFFICE 2,321,218

PRODUCTION OF SODIUM SULPHATE

Charles L. Levermore, Rockville Centre, N. Y., assignor to General Chemical Company, New York, N. Y., a corporation of New York No Drawing. Application June 14, 1940,
Serial No. 340,475

6 Claims. (Cl. 23—121)

This invention is concerned with the manufacture of sodium sulphate of high purity, for example, of such purity as meets the stringent requirements of the textile industry.

It has been proposed heretofore to prepare sodium sulphate by forming a neutral sodium sulphate solution, for example by dissolving in water an acidic sodium sulphate such as nitre cake together with sufficient soda ash to neutralize the sulphuric acid present in the acidic sodium sulphate, purifying, and thereafter concentrating the neutral sodium sulphate solution by evaporation to precipitate sodium sulphate. This method requires the evaporation of about three pounds of water per pound of product to produce anhydrous sodium sulphate and hence has been found to be costly.

It is an object of this invention to prepare substantially pure normal sodium sulphate from impure acidic sodium sulphate, or mixtures of the same with sodium sulphate, without the necessity of evaporating such large quantities of water.

It is a particular object of this invention to provide a process for preparing substantially pure anhydrous normal sodium sulphate from commercial nitre cake, which process results in the production of a substantially pure sodium sulphate product meeting the stringent requirements of the textile industry at a lower cost than heretofore known processes.

I have found that substantially pure normal sodium sulphate may be produced from an impure acidic sodium sulphate such as nitre cake by dissolving the impure acidic sodium sulphate in water or in weak sodium sulphate solution to form a strong acidic sodium sulphate solution containing not more than about 20% sulphuric acid by weight (free sulphuric plus the acid equivalent of acid sulphate present), and precipitating normal sodium sulphate from the solution by adding a sodium compound effective to reduce the acidity of the solution, for example soda ash, sodium bicarbonate, anhydrous sodium sulphite or sodium meta-bisulphite. Water may also be evaporated from the solution during or after the addition of the sodium compound; during such evaporation, however, the sulphuric acid concentration should not be allowed to rise above about 20%. The solution of the impure acidic sodium sulphate may advantageously be treated to remove impurities before precipitating sodium sulphate therefrom.

The precipitation of normal sodium sulphate by reduction of the acidity of an acidic sodium sulphate solution in accordance with the process of my invention has surprising advantages; for example, the yield of normal sodium sulphate obtained is substantially higher than can be accounted for on the basis of the sodium sulphate formed by the neutralization reaction. The feature of regulating and maintaining the acidity of the solution of acidic sodium sulphate so that the concentration of sulphuric acid therein does not exceed about 20% is an important feature of the process of this invention, since it is only at acid concentrations of about 20% or below that the precipitation of normal sodium sulphate rather than acid sodium sulphate is assured. That is, if the acidity of the solution substantially exceeds about 20%, the solid which precipitates initially upon neutralization or concentration may be partially or wholly an acid sodium sulphate, which contaminates the desired pure normal sodium sulphate product. I have found it particularly advantageous to regulate the initial acidity of the solution substantially at 20% since at this acid concentration a maximum amount of sodium sulphate may be brought into solution.

In cases where a raw material containing iron as an impurity is used, e. g. nitre cake, another important feature of the process of this invention is the order of steps employed in effecting purification of the solution of sodium acid sulphate. In such cases I have found that to accomplish effectively the removal of impurities the nitric acid content of the solution should first be substantially reduced or completely eliminated. This is preferably accomplished by adding sodium bisulphite to the solution and expelling the nitrous gases and $SO_2$ by heating the solution to the boiling point. Thereafter residual $SO_2$ and the ferrous iron in the solution are oxidized, for example by means of potassium permanganate. The iron is then precipitated by treating the solution with a suspension containing powdered active carbon, infusorial earth and sodium ferrocyanide. Treatment of the solution with the suspension facilitates the removal of iron, particularly as compared with the separate addition of the infusorial earth and powdered carbon to the solution.

In the preferred method of carrying out the process of my invention, i. e. when the initial acid concentration is regulated to about 20%, I have found it advantageous to adjust the sodium sulphate concentration so that the ratio of sodium sulphate to sulphuric acid is at least 1.9 parts by weight of sodium sulphate to each part by weight of sulphuric acid present; when operating at or near the boiling point of the solution it is particularly advantageous to adjust this ratio to at least 2 parts by weight of sodium sulphate to one part by weight of sulphuric acid. Therefore, in dissolving acidic sodium sulphate wherein the ratio of sodium sulphate to sulphuric acid is below this value, mother liquor (which generally contains about 32% $Na_2SO_4$ and substantially no acid) from a previous operation may be added to the impure acidic sodium sulphate until the ratio of sodium sulphate to sulphuric acid has reached the above value. If the resultant mixture of impure sulphate and mother liquor contains more than about 20% sulphuric acid, water is added to reduce the sulphuric acid concentration of the resultant solution to about 20%. If the mixture of impure sulphate and mother liquor has an acid content substantially below about 20%, sulphuric acid may be added to the resultant mixture to bring the concentration of sulphuric acid up to about 20% and thus obtain maximum solubility of sodium sulphate. As indicated above, when operating under these preferred conditions the solution is maintained at or near its boiling point.

The resultant solution is then treated to remove impurities; as above indicated, when iron is present as an impurity it is important to first remove or substantially reduce the nitric acid content of the solution by treatment with sodium bisulphite or by gassing with $SO_2$ while the solution is sufficiently hot to expel the nitrous gases. Thereafter $SO_2$ and a trace of ferrous iron present are oxidized with a small amount of potassium permanganate and sodium ferrocyanide is added along with a filter aid to effect removal of iron. The purified solution can then be mixed with any unused balance of mother liquor from the previous batch, heated to its boiling point, agitated, and gradually treated with clean soda ash or other sodium compound to neutralize the free acid and precipitate anhydrous normal sodium sulphate. The solution may be cooled to precipitate further quantities of the anhydrous sodium sulphate. Precipitated anhydrous sodium sulphate thus produced is separated from the mother liquor by wringing, washing free from mother liquor, and drying. The amount of water removed by evaporation in carrying out this process to produce anhydrous sodium sulphate amounts only to about one-half pound per pound of product.

By adding mother liquor from a previous batch to the nitre cake, an accumulation thereof is avoided. The addition of any excess mother liquor to the acidic sodium sulphate solution over that required to correct the $Na_2SO_4$-to-$H_2SO_4$ ratio to not less than 1.9 should be made after the purification thereof rather than before purification, since in this way the handling of larger quantities of solution during the purification step is avoided and the possible precipitation of anhydrous sodium sulphate product through reduction of the acid concentration is also avoided. Other procedures, however, may be used. For example, all of the mother liquor may be added to the nitre cake in the first step and enough sulphuric acid and water, if necessary, added to the resultant mixture to adjust the $Na_2SO_4$-to-$H_2SO_4$ ratio to not less than 1.9 and bring the $H_2SO_4$ concentration to not more than about 20%.

A specific example of this invention, given for purposes of illustration, is as follows:

889 parts of nitre cake (containing 38% $H_2SO_4$ and 61% $Na_2SO_4$) were dissolved in 418 parts mother liquor (containing 0.5% $H_2SO_4$ and 32% $Na_2SO_4$) and 383 parts of water. The resulting solution contained about 20% $H_2SO_4$ and about 40% $Na_2SO_4$. The hot nitre cake solution thus formed was treated with 8.4 parts 35° Bé. sodium bisulphite solution diluted with an equal weight of water to reduce the nitric acid present in the solution. The nitrous gases thus formed and excess $SO_2$ were expelled by heating the solution to the boiling point. Boiling was stopped after one-quarter of an hour, and the residual $SO_2$ and a trace of ferrous iron were oxidized by adding 0.06 part potassium permanganate. The iron content of this solution was 0.6 part $Fe_2O_3$. To remove the iron the solution was treated with a suspension consisting of 4.4 parts of powdered active carbon and 8.9 parts infusorial earth (supercelite) in 40 to 80 parts of a solution containing 3.6 parts of recovered sodium ferrocyanide and 0.4 part of fresh sodium ferrocyanide. The Prussian blue precipitate was filtered off and reconverted to sodium ferrocyanide for use in treatment of a succeeding batch by digesting in a solution of caustic soda and filtering off the iron hydroxide.

The purified nitre cake solution was mixed with the balance of the mother liquor from the previous batch, then heated to the boiling point, agitated violently and gradually treated with clean soda ash in a state of subdivision such as passes a 50-mesh screen until the free acidity of the solution was reduced to about 0.5% $H_2SO_4$. The total amount of water evaporated during this neutralizing operation was about 500 parts, equal to about one-half pound per pound of product. The precipitated anhydrous sodium sulphate was separated from the mother liquor by wringing, then washed and dried.

An analysis of the resulting product showed that it had a $Na_2SO_4$ content of 99.76%, was free of calcium oxide, magnesium oxide, sulphuric acid, sodium carbonate and sodium hydroxide, and contained .001% NaCl, .0008% iron, .0016% $NaHCO_3$, .000005% $As_2O_3$, .0005% of heavy metals calculated as lead, and less than .007% insoluble material. The product produced by the process of this invention meets the stringent requirements of the textile industry.

It will be noted that the process of this invention possesses the important economic advantage of eliminating most of the costly evaporation required in prior procedures of producing sodium sulphate; this process requires evaporation of only about one-half pound of water per pound of product produced as compared with prior processes which require the evaporation of about 3 pounds of water per pound of product, a reduction of about 83%.

It will be further noted that the process of this invention results in the production of a substantially pure sodium sulphate product which meets the requirements of the textile industry.

In the claims wherever reference is made to the concentration or proportion of sulphuric acid in solution, it is to be understood that the total of free sulphuric acid and the acid equivalent of sodium acid sulphate is meant.

It is to be further understood that this invention is not restricted to the present disclosure otherwise than as defined by the appended claims.

I claim:

1. A process of converting impure acidic sodium sulphate into substantially pure normal sodium sulphate comprising forming a solution of the impure acidic sodium sulphate substantially saturated with respect to sodium sulphate and containing about 20% sulphuric acid by weight, and causing precipitation of normal sodium sulphate by substantially neutralizing said solution by treatment with a sodium compound.

2. A process of converting nitre cake into substantially pure normal sodium sulphate comprising forming a solution of said nitre cake by adding thereto water and sufficient mother liquor containing sodium sulphate from a previous batch so that the solution contains a ratio by weight of sodium sulphate to sulphuric acid of not less than about 1.9 to 1 and not more than about 20% sulphuric acid, treating said solution with sodium bisulphite, boiling to remove nitrous gases and $SO_2$, oxidizing residual $SO_2$ and ferrous iron in the solution, removing ferric iron by treating the solution with sodium ferrocyanide, and then precipitating normal sodium sulphate by substantially neutralizing the free acid content of the solution with soda ash.

3. A process for converting nitre cake into substantially pure anhydrous normal sodium sulphate comprising forming an aqueous solution of the said nitre cake together with sufficient mother liquor containing sodium sulphate from a previous batch to make the ratio by weight of sodium sulphate to sulphuric acid not less than about 1.9, said solution containing about 20% sulphuric acid, treating said solution with sodium bisulphite, boiling to remove nitrous gases and $SO_2$, oxidizing residual $SO_2$ and ferrous iron in the solution, removing ferric iron by treating the solution with sodium ferrocyanide, and then precipitating anhydrous normal sodium sulphate by substantially neutralizing the free acid content of the solution with soda ash.

4. A process for converting impure acidic sodium sulphate into substantially pure normal sodium sulphate, comprising forming an aqueous solution of the impure acidic sodium sulphate substantially saturated with respect to the acidic sodium sulphate and containing about 20% sulphuric acid by weight of the solution, and reducing the acidity of said solution by addition of an alkaline material until a substantial amount of substantially pure normal sodium sulphate has been precipitated due to said reduction in acidity.

5. A process for converting nitre cake into substantially pure anhydrous normal sodium sulphate, comprising forming an aqueous solution of the nitre cake substantially saturated with respect to acidic sodium sulphate and containing about 20% sulphuric acid by weight of the solution, freeing said solution from impurities and reducing the acidity of said solution by addition of a sodium compound until a substantial amount of substantially pure anhydrous normal sodium sulphate has been precipitated, due to said reduction in acidity, while maintaining said solution near its boiling point.

6. A process for converting nitre cake into substantially pure normal sodium sulphate, comprising forming a solution of nitre cake substantially saturated with respect to acidic sodium sulphate and containing about 20% sulphuric acid by weight of the solution, reducing a substantial amount of the nitric acid present in the solution and expelling the nitrous gases thus formed, oxidizing the residual $SO_2$ and ferrous iron in the solution, removing ferric iron thus formed and then reducing the acidity of said solution by addition of a sodium compound until a substantial amount of substantially pure normal sodium sulphate has been precipitated, due to said reduction in acidity.

CHARLES L. LEVERMORE.